Aug. 9, 1927.　　　　　　　　　　1,638,478
E. W. ENGLE
BATTERY CHARGING APPARATUS
Filed Oct. 5, 1923　　　　2 Sheets-Sheet 1

Inventor
Edgar W. Engle

Aug. 9, 1927. 1,638,478
E. W. ENGLE
BATTERY CHARGING APPARATUS
Filed Oct. 5, 1923 2 Sheets-Sheet 2

Inventor
Edgar W. Engle

Patented Aug. 9, 1927.

1,638,478

UNITED STATES PATENT OFFICE.

EDGAR W. ENGLE, OF LAKE FOREST, ILLINOIS, ASSIGNOR TO FANSTEEL PRODUCTS COMPANY, INC., OF NORTH CHICAGO, ILLINOIS, A CORPORATION OF NEW YORK.

BATTERY-CHARGING APPARATUS.

Application filed October 5, 1923. Serial No. 666,701.

This invention relates to a method of charging high voltage storage batteries by means of a rectifier, preferably an electrolytic rectifier, and also to a switch which is employed in the charging circuits in order to change the groups of cells of the battery from series operative relation to parallel relation for charging purposes.

The object of the invention is to provide a circuit arrangement whereby a high voltage storage battery may be readily charged by alternating current through the medium of a rectifier having comparatively low voltage output, and also the provision of a switch which will permit the groups of cells of the storage battery to be readily connected in parallel relation for charging.

One of the features of the invention is the method and circuits employed whereby the pulses of same polarity of alternating current are caused to pass through groups of cells of the storage battery in parallel.

Another feature of the invention is the circuit arrangement whereby the groups of cells are connected in series relation for operating purposes, or connected in parallel relation to the rectifier leads for charging purposes.

A still further feature of the invention resides in the switch which in one position connects certain conductors of the circuit above referred to in series relation, and in another position connects groups of conductors in parallel relation.

In the drawings.

The mechanical structure of the switch employed will first be described, reference being had to the accompanying drawings in which like reference characters indicate like parts in the several views.

Figure 1:
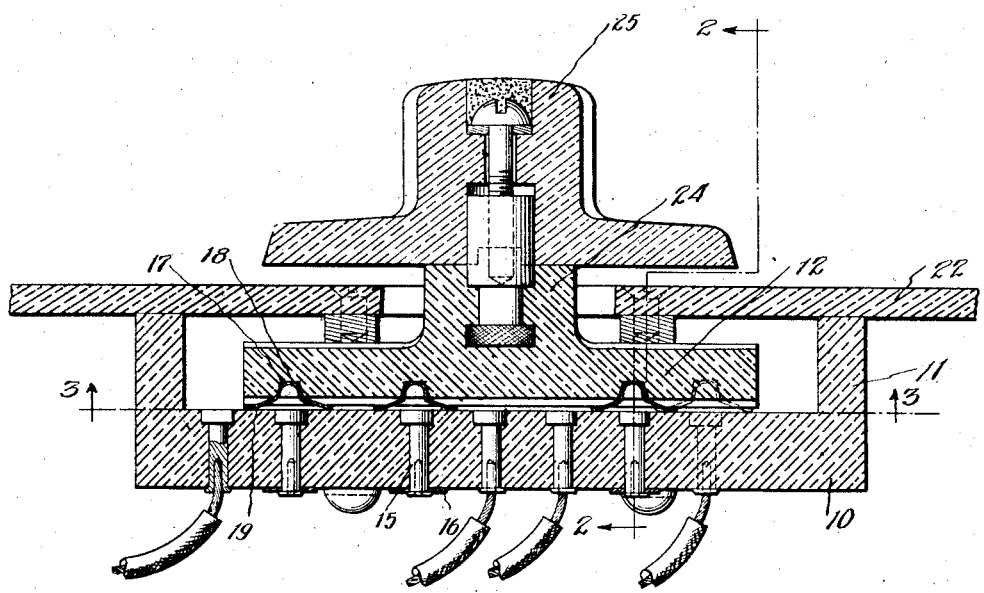
Figure 1 is a longitudinal sectional view through the switch.

The base 10 of the switch, which is preferably formed of insulating material such as fibre board, bakelite, or other well known insulating substance, is provided with an upstanding marginal portion 11 within which is mounted the movable brush carrying member 12 of the switch, which is also of insulating material. The movable switch block 12 is transversely of such width as to slidably fit between the upstanding flanges 11 at the sides of the block 10. The block 12, however, is somewhat shorter than the depression in the block 10 so as to permit it to be moved into various operative positions.

Figure 2:
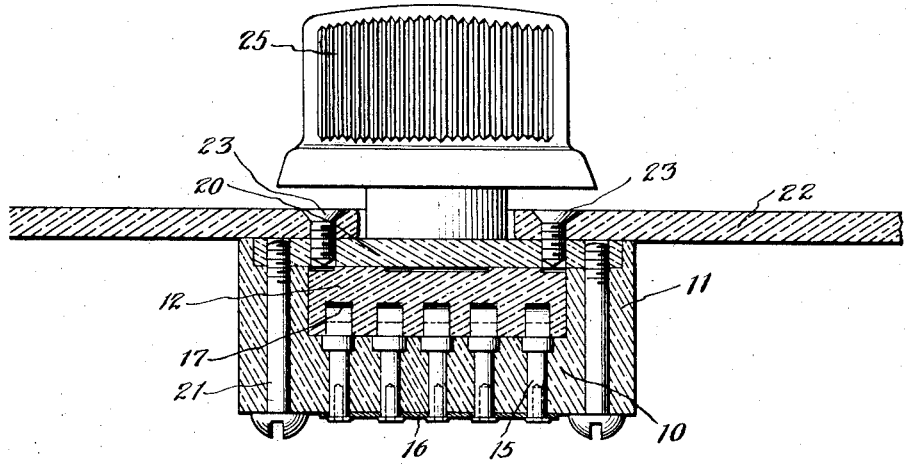
Figure 2 is a section substantially on the line 2—2 of Figure 1, looking in the direction of the arrow.
Figure 5:
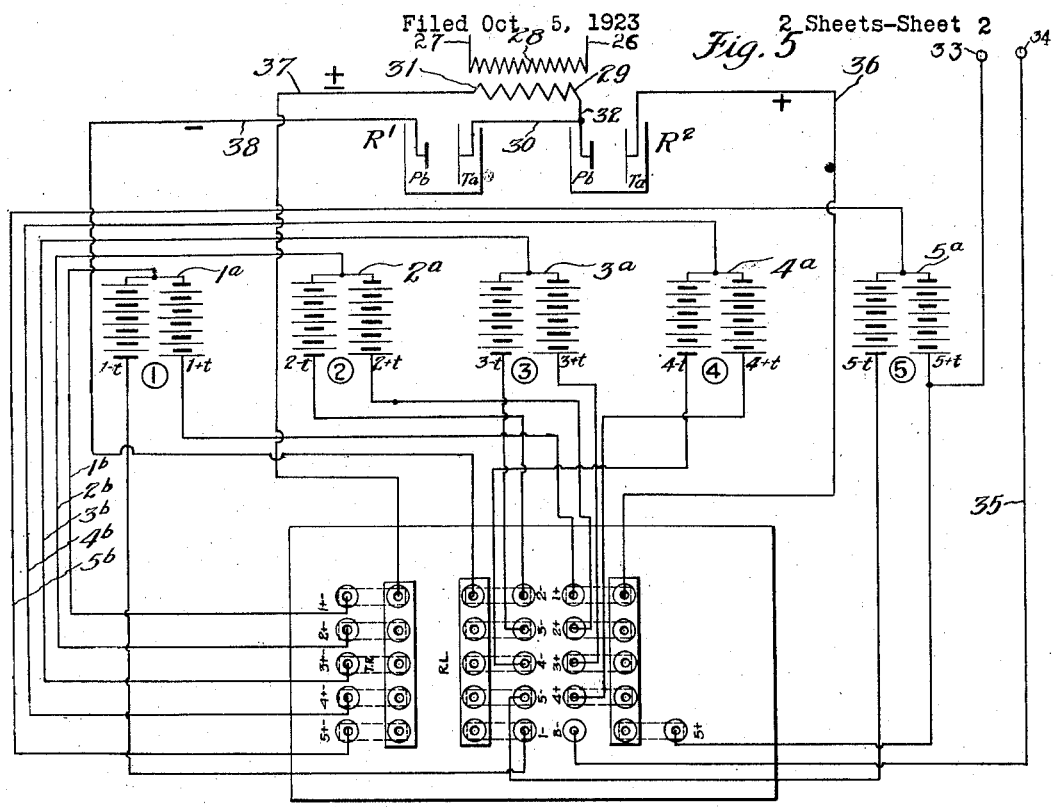
Figure 5 is a diagrammatic representation of the switch, the rectifiers, battery cells and circuits employed in the present invention.
Figure 4:
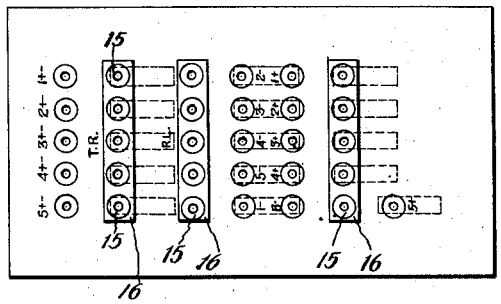
Figure 4 is a schematic plan view of the stationary contact portion of the switch, showing the arrangement of contacts, and also indicating in dotted lines the positions occupied by the brush or wiper members carried by the movable switch member.
Figure 3:
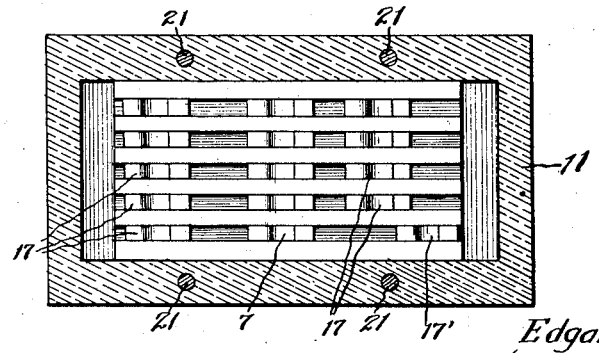
Figure 3 is a section substantially on the line 3—3 of Figure 1.

The base block 10 is provided with six rows, each row consisting of five stationary contacts, as indicated in Figure 4. The contacts of one of these rows are indicated by the numerals 1 to 5 followed by the designations+ —. The contacts of another row are indicated by the numerals 1 to 5 with the designation—, and those of another row with the numerals 1 to 4 with the designation+, the fifth contact of this row being indicated B—. There is also, in addition to the six rows of contacts, a further contact designated as 5+. The contacts of the other rows generally indicated as 15 are connected together in groups of five by the connector strips 16 (see Figs. 1, 2 and 4). The contact members themselves are preferably provided with enlarged heads which are countersunk substantially to the upper surface of the base block 10 and are secured within the base 10 in any desired or suitable manner. Each of the individual contacts, with the exception of the three groups of connected contacts 15 forms the terminal of a conductor as indicated in Figures 1 and 5. A conductor is also joined to each of the connecting plates of the three groups of contacts as indicated in Figure 5.

The movable switch member 12 is provided in its lower surface with three rows of depressions 17, there being five depressions in each of two of the rows, and four in the other. There is also an aditional depression indicated as 17′. Each of these depressions is adapted to receive the upstanding curved portion 18 of a brush or wiper 19. The wipers 19 are formed of any suitable flexible conducting material and in certain positions are adapted to engage adjacent contacts so as to electrically connect them.

Overlying the block 12 is a pair of retainer strips 20 secured in position by the screws 21. If desired, the inwardly projecting edges 22 of a panel or supporting cabinet may be positioned above the retainer strips 20 and secured thereto by means of the screws 23. Secured to the upwardly extending portion 24 of the brush block 12, in any suitable manner, is a handle or operating member 25 by means of which the movable member of the switch may be readily moved back and forth.

Referring now to Figures 1 and 4 of the drawings, it will be noted that when the brush block 12 is moved to the left, as viewed in Figure 1, the brushes 19 will act to connect the + − contacts in parallel to the adjacent contacts 15, which are electrically connected by the corresponding plate 16, and that the − contacts will, in a similar manner, be connected in parallel through the medium of the adjacent contacts 15 and connector plate 16, and that the + contacts 1 to 4 will likewise be connected in parallel to the electrically joined contacts 15 at the right in Figure 4. Thus, when the switch block is moved to the left, all the + − contacts are connected together, all the − contacts are connected together, and also the + contacts are connected together, as the various brushes 19 act to electrically join the various terminal contacts indicated as + −, −, and + to the contacts 15 which are electrically joined together in groups by the connector strips 16. The extreme left positions occupied by the brushes are indicated by dotted rectangles in Figure 5. When the movable switch member is moved to the extreme right, as viewed in Figure 1, the brushes occupy the positions indicated by the dotted rectangles in Figure 4. In this position, the only brushes which are effective are those of the middle row which act to connect the contacts in pairs to join the sections of the storage battery in series relation for operating purposes, as will be more fully hereinafter explained.

Referring now to Figure 5, 26 and 27 indicate conductors bridged across a power circuit and joined by the primary 28 of a step-down transformer or induction coil 29. $R^1$ and $R^2$ indicate electrolytic rectifiers, preferably of the type consisting of electrodes of tantalum Ta and lead Pb in an acid electrolyte. The lead electrode Pb of the rectifier $R^2$ is joined to the tantalum electrode Ta of the rectifier $R^1$ by means of the conductor 30. One end of the secondary coil 31 of the transformer 29 is joined to the conductor 30 through the medium of conductor 32.

In Figure 5, characters ①, ②, ③, ④, and $S^5$ indicate groups of storage battery cells, each of which consists of two series or subgroups of cells which are joined by the bars $1^a$, $2^a$, $3^a$, $4^a$ and $5^a$, respectively. The positive and negative terminals of the battery groups are indicated by the characters 1−t, 1+t, 2−t, etc. The conductors $1^a$, $2^a$, $3^a$, $4^a$ and $5^a$ are joined through the medium of conductors $1^b$, $2^b$, $3^b$, $4^b$ and $5^b$, respectively, to the corresponding + − contacts of the switch. The negative terminals of the various battery sections are joined in like manner to the corresponding − contacts of the switch, and in a similar way the positive terminals of the battery sections are joined to the + contacts of the switch.

At the upper right hand corner of Figure 5 are indicated terminals 33 and 34 which are the terminals of the switch. Terminal 33 is joined to the conductor which joins the 5+t terminal of battery group 5 to the contact 5+. The terminal 34 is joined through the medium of conductor 35 with contact B− of the switch. Terminal 33 is the positive terminal of the battery, and terminal 34 is the negative terminal.

We will assume now that the movable switch member has been moved to the left so that the brushes occupy the positions indicated in Figure 5. If now alternating current is passed through the primary coil 28, oscillations of current will be set up in the secondary coil 31. The rectifiers $R^1$ and $R^2$ are oppositely connected to one end of the secondary coil 31 so that one-half of each cycle of current will pass through one rectifier, and the other half of the cycle will pass through the other rectifier.

Thus during one-half of each cycle, current will pass from the coil 31 through the rectifier $R^2$ and out over the positive conductor 36 to all of the positive terminals 1+t, 2+t, etc. in parallel, thence through the corresponding series of battery cells to the connecting bars $1^a$, $2^a$, etc., thence through the conductors $1^b$, $2^b$, etc., which at this time will be all joined together through the switch brushes, and back through the + − conductor 37 to the opposite side of the coil 31. During this operation, the rectifier $R_1$ will act to prevent passage of current in the opposite direction.

During the other half of each cycle, the reverse operation will take place, that is, current will pass through the rectifier $R^1$, but will be prevented from passing through the rectifier $R^2$. Thus, during this half of the cycle, current will pass from the coil 31 through the + − conductor 37, to the mid points of each of the battery cell groups, thence through the left sub-groups of the various battery containers in parallel, to the negative contacts thereof, thence through the switch contacts, through the negative conductor 38, rectifier cell $R_1$, conductors 30 and 32, to the opposite terminal of the transformer coil 31.

It will now be seen that during one-half of each cycle, current is supplied to the right group of cells of each container, and that during the other half of each cycle, current is supplied to the left group of cells of each container.

Assuming that each of the battery containers 1 to 5 contains two groups of cells of six cells in each group, the entire battery will consist of sixty cells which would supply a voltage of upward of 120 volts. It is sometimes desirable to charge such a battery in sections. Therefore, according to the present invention, the entire battery is broken up into five sections, each section of which is again sub-divided into two sections. Thus corresponding halves of the five sections are charged in parallel during one-half of each cycle, and the other corresponding halves of the five sections are charged during the other half of each cycle.

When it is desired to connect the various groups of cells in series relation for operating purposes, the switch member is moved to the right, as viewed in Figure 1. This causes the brushes to occupy the positions shown in Figure 4 wherein contact 1+ is connected to contact 2−, contact 2+ to contact 3−, contact 3+ to contact 4−, contact 4+ to contact 5−, and contact B− to contact 1−. It will be remembered that the contact B− is joined directly to the battery terminal 34 through conductor 35. It will also be noted from Figure 1 that contact 5+ is joined directly to the terminal contact 33. Thus, with the switch brushes in this position, all the cells of the battery are joined in series relation. When the switch is in this position, the + − contacts are unengaged and the 5+ contact is electrically isolated.

The switch herein shown may also be employed in an obvious manner to connect in series the sections of a high voltage battery to permit it to be charged from a lower voltage source of direct current.

When the contacts and brushes are properly proportioned and arranged, the switch brushes may be caused to occupy an intermediate position in which the groups of cells of the battery are disconnected from each other, that is, they will be connected neither in parallel nor in series relation.

While in the present disclosure each rectifier is shown as a single cell, it is to be understood that several cells may be joined in series relation, or that groups of cells may be joined in series parallel relation under certain circumstances, thus giving improved results. In the following claim, therefore, it is to be understood that where a rectifier is referred to, this term should be considered to include such groups of rectifier cells which together form a single rectifier unit.

While in the above description and in the drawings, applicant has limited himself to a single set of details, it is to be understood that certain modifications and variations are contemplated, and the invention, therefore, is to be limited merely by the scope of the appended claim.

What I claim is:

In combination, an alternating current transformer having a primary and secondary coil, a pair of electrolytic rectifiers, means joining unlike terminals of said rectifiers to one terminal of the secondary coil of the transformer, and a switch in one position adapted to join the mid points of a plurality of groups of storage battery cells to the other terminal of said secondary coil, and also join the free terminal of one of said rectifiers to the positive terminals of said cell groups, and the free terminal of said other rectifier to the negative terminals of said cell groups, said switch being adapted in another position to join said groups of cells in series relation.

In witness whereof, I hereunto subscribe my name this 2 day of October, 1923.

EDGAR W. ENGLE.